(12) United States Patent
McFarland et al.

(10) Patent No.: US 10,917,017 B1
(45) Date of Patent: Feb. 9, 2021

(54) SYSTEM AND METHOD TO CONTROL A RESONANT POWER CONVERTER

(71) Applicant: GE Precision Healthcare LLC, Wauwatosa, WI (US)

(72) Inventors: Thomas G McFarland, Hartland, WI (US); Eric Aasen, Pewaukee, WI (US)

(73) Assignee: GE Precision Healthcare, Wauwatosa, WI (US)

( * ) Notice: Subject to any disclaimer, the term of this patent is extended or adjusted under 35 U.S.C. 154(b) by 0 days.

(21) Appl. No.: 16/717,195

(22) Filed: Dec. 17, 2019

(51) Int. Cl.
*H02M 3/335* (2006.01)
*H02M 3/337* (2006.01)

(52) U.S. Cl.
CPC ..... *H02M 3/33507* (2013.01); *H02M 3/3376* (2013.01)

(58) Field of Classification Search
CPC ......... H02M 3/33538; H02M 3/33546; H02M 3/33515; H02M 3/33576; H02M 3/33592; H02M 3/33553; H02M 3/33523; H02M 3/3376
See application file for complete search history.

(56) References Cited

U.S. PATENT DOCUMENTS

| | | | |
|---|---|---|---|
| 4,672,528 A | 6/1987 | Park | |
| 4,951,185 A | 8/1990 | Schutten | |
| 5,646,835 A | 7/1997 | Katcha | |
| 6,178,099 B1 | 1/2001 | Schutten | |
| 6,351,401 B1* | 2/2002 | Scheel | H02M 3/3376 363/98 |
| 9,287,795 B2 | 3/2016 | Ma | |
| 9,425,700 B2 | 8/2016 | Lu | |
| 2013/0099787 A1* | 4/2013 | Lu | H02M 3/3376 324/319 |
| 2019/0058404 A1 | 2/2019 | Gadenne | |
| 2019/0182944 A1 | 6/2019 | Ernest | |

OTHER PUBLICATIONS

P.S. Niklaus, D. Bortis and J.W. Kolar, "Next Generation Measurement Systems with High Common-Mode Rejection," 2018 IEEE 19th Workshop on Control and Modeling for Power Electronics (COMPEL), Padua, Jun. 25, 2018, pp. 1-8.

* cited by examiner

*Primary Examiner* — Adolf D Berhane
*Assistant Examiner* — Afework S Demisse

(57) ABSTRACT

A resonant power converter includes a full bridge configuration of switching devices and a resonant tank circuit coupled between the full bridge and an isolation transformer having a primary winding and a secondary winding. A full bridge rectifier is coupled between the isolation transformer and a load. A converter controller for generating switching signals for the switching devices includes an outer controller to generate a tank command signal based on a voltage error signal between an output voltage command signal and an actual output voltage signal and an inner controller to generate an actual tank signal based on a secondary winding current and the output voltage command signal. The converter controller also includes a signal generator for generating the switching signals for the switching devices based on a tank error signal between the tank command signal and the actual tank signal.

21 Claims, 9 Drawing Sheets

SYSTEM AND METHOD TO CONTROL A RESONANT POWER CONVERTER

BACKGROUND

The subject matter disclosed herein relates to power converters and specifically to control of a resonant power converter such as a series resonant power converter.

In magnetic resonance imaging (MRI) systems, three gradient magnetic field coils are generally used to create time-varying gradient magnetic fields in three dimensions (x, y, z). Resonant converters are utilized in MRI system for supplying power to amplifiers that control these gradient magnetic field coils.

Further, in x-radiation (X-ray) imaging systems or computed tomography (CT) imaging systems, x-ray tubes are included to generate X-rays for these imaging systems. The X-ray tube has an anode and a cathode that are utilized to generate high-energy electromagnetic radiation, e.g., X-rays. A high voltage (e.g., 30-150 kilovolts) is generally applied between the anode and the cathode of the X-ray tube to cause acceleration of electrons toward a target anode to generate the X-rays. Resonant converters may be used in X-ray and CT imaging systems for providing the high voltage across the anode and cathode of the X-ray tubes.

Moreover, there is also broad use of resonant converters in DC-DC power supplies throughout industry providing high power efficiency. Control of resonant DC-DC converter topology has been a challenge given the complexity of defining and adapting to a plant-gain variation versus load power. The circuit designer desires to have a maximum control bandwidth limited only by the switching frequency of the converter but needs to reduce the bandwidth to maintain control loop stability.

Various control methods are available for controlling resonant power converter output. However, most of these control methods are complex and require several sensors and are very expensive to manufacture. Moreover, there are limitations on these control methods during light load operation. Therefore, there is a need for an improved control system and method to control the resonant converters.

BRIEF DESCRIPTION

In accordance with an embodiment of the present technique, a resonant power supply is provided. The resonant power supply includes a resonant power converter configured to convert an input direct current (DC) voltage to an output DC voltage. The resonant power converter includes a full bridge configuration of switching devices for converting the input DC voltage to a first alternating current (AC) voltage and a resonant tank circuit having a resonant inductor and a resonant capacitor coupled between the full bridge configuration of switching devices and an isolation transformer. The isolation transformer includes a primary winding and a secondary winding, wherein the isolation transformer converts the first AC voltage to a second AC voltage. The resonant power converter further includes a full bridge rectifier for converting the second AC voltage to the output DC voltage. a converter controller coupled to the resonant power converter for generating switching signals for the switching devices is also provided in the resonant power supply. The converter controller includes an outer controller to generate a tank command signal based on a voltage error signal between an output voltage command signal and an actual output voltage signal and an inner controller to generate an actual tank signal based on a secondary winding current and the output voltage command signal. The converter controller also includes a signal generator for generating the switching signals for the switching devices based on a tank error signal between the tank command signal and the actual tank signal.

In accordance with another embodiment of the present technique, a method for controlling a resonant power supply is provided. The resonant power supply includes a full-bridge configuration of switching devices, a resonant tank circuit having a resonant inductor and a resonant capacitor and an isolation transformer having a primary winding and a secondary winding. The resonant tank circuit is coupled between the full-bridge configuration and the isolation transformer. The method includes generating a tank command signal based on a voltage error signal between an output voltage command signal and an actual output voltage signal of the resonant power supply and generating an actual tank signal based on a secondary winding current and the output voltage command signal. The method further includes generating switching signals for the switching devices based on a tank error signal between the tank command signal and the actual tank signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present embodiments, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
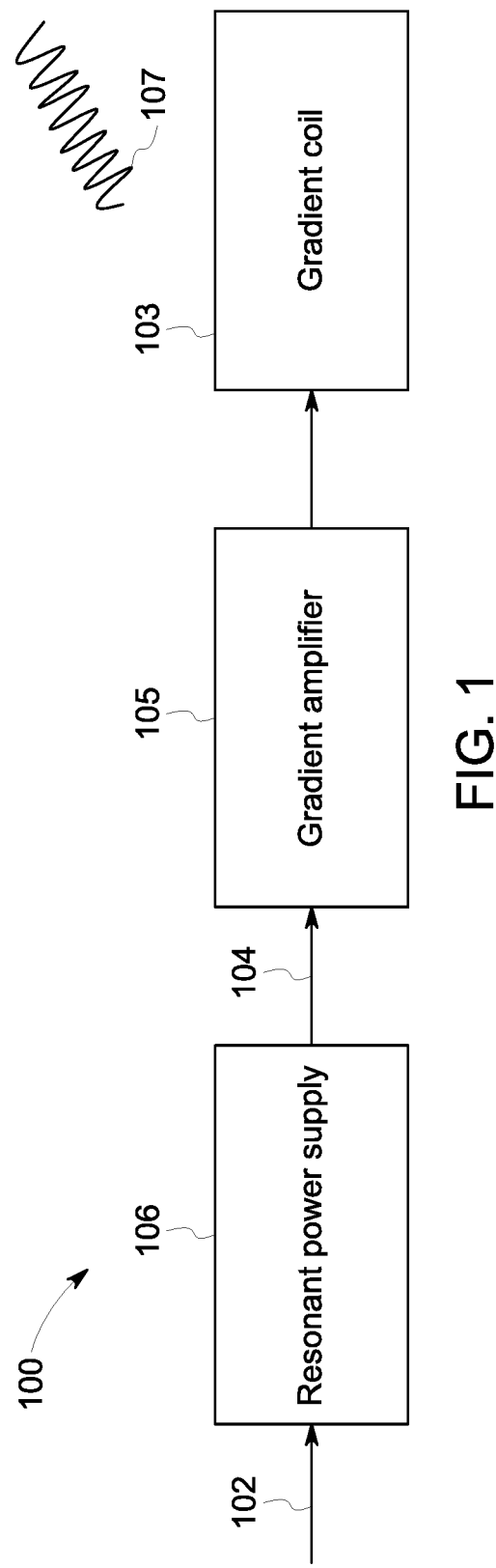
FIG. 1 is a block diagram of a sub-system of a magnetic resonance imaging (MRI) system in accordance with an exemplary embodiment of the present disclosure.

FIG. 1 illustrates a block diagram of a sub-system 100 of a magnetic resonance imaging (MRI) system in accordance with an exemplary embodiment of the present disclosure. The sub-system 100 includes a resonant power supply 106 for receiving input power 102 from a power source (not shown) and regulating the input power 102 to provide output power 104. The output power 104 is supplied to a gradient amplifier 105 which drives one or more gradient coils 103 (e.g., three gradients coils) to generate a gradient field 107 to facilitate image acquisition of the magnetic resonance system. In an embodiment of the invention, the resonant power supply 106 includes a series resonant power converter that is operated to convert the input power 102 in the form of unregulated DC voltage to the output power 104 in the form of regulated DC voltage. As will be appreciated by those skilled in the art, FIG. 1 generally illustrates one of the applications that the resonant power supply 106 can be used to supply power to one or more components of the sub-system or system. It is not intended to limit the application to MRI systems, and the resonant power supply 106 can be used to supply power in other applications such as computed tomography (CT) imaging systems, X-ray imaging systems, communication systems, welding systems and so on.

Figure 2:
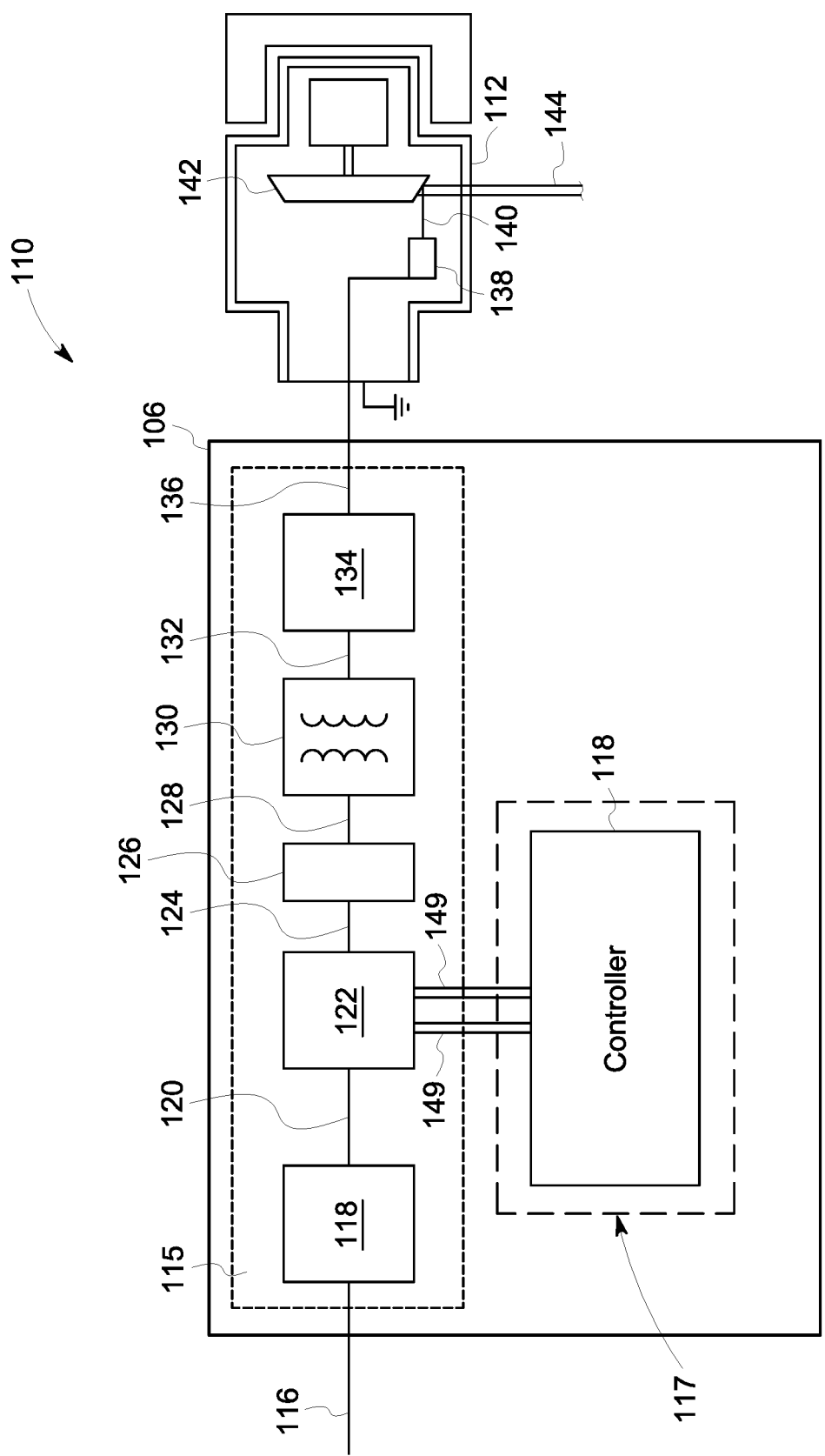
FIG. 2 is a schematic diagram of an X-ray generation sub-system that may be utilized in an X-ray or CT imaging systems.

FIG. 2 is a schematic diagram of a portion (X-ray tube/power supply assembly 110) of a CT imaging system. The X-ray tube/power supply assembly 110 includes an X-ray tube 112 communicating with a high-voltage DC power supply 106. Generally, the high-voltage DC power supply 106 includes a high-power section 115 and a low-power section 117.

The high-power section 115 of the power supply 106 will receive line voltage 116, for example, 100-240 volts AC at 50-60 hertz which may be converted by a rectifier/filter assembly 118 into desired DC bus voltage 120 suitable for semiconductor switching. This DC bus voltage 120 is received by a switch array 122 which converts the DC bus voltage 120 into a "square wave" drive signal 124 that feeds a resonant tank circuit 126, for example, formed from a series connected inductor and capacitor. In general, the tank circuit also called as a LC circuit is an electric circuit consisting of an inductor L, and a capacitor C connected together. An output of the resonant tank circuit 126 provides a low-harmonic synthesized AC signal 128 that may be received by a step-up transformer 130 providing a high-voltage AC signal 132. The high-voltage AC signal 132 is provided to an output rectifier/filter assembly 134 outputting a high-voltage DC output 136 suitable for providing voltage to a cathode assembly 138 of the X-ray tube 112 accelerating electron beam 140 toward a target 142 to produce a beam of X-rays 144.

The high-power section 115 communicates with the low-power section 117 which, for example, may be implemented as a field programmable gate array (FPGA) microprocessor or the like. The low-power section 117 provides a controller 118 which generates control signals over control lines 149 to control the switch array 122. In this regard, the controller 146 may receive a feedback signal to control the switching of the switches of the switch array 122 through switch control lines 149 as will be discussed below.

Figure 3:
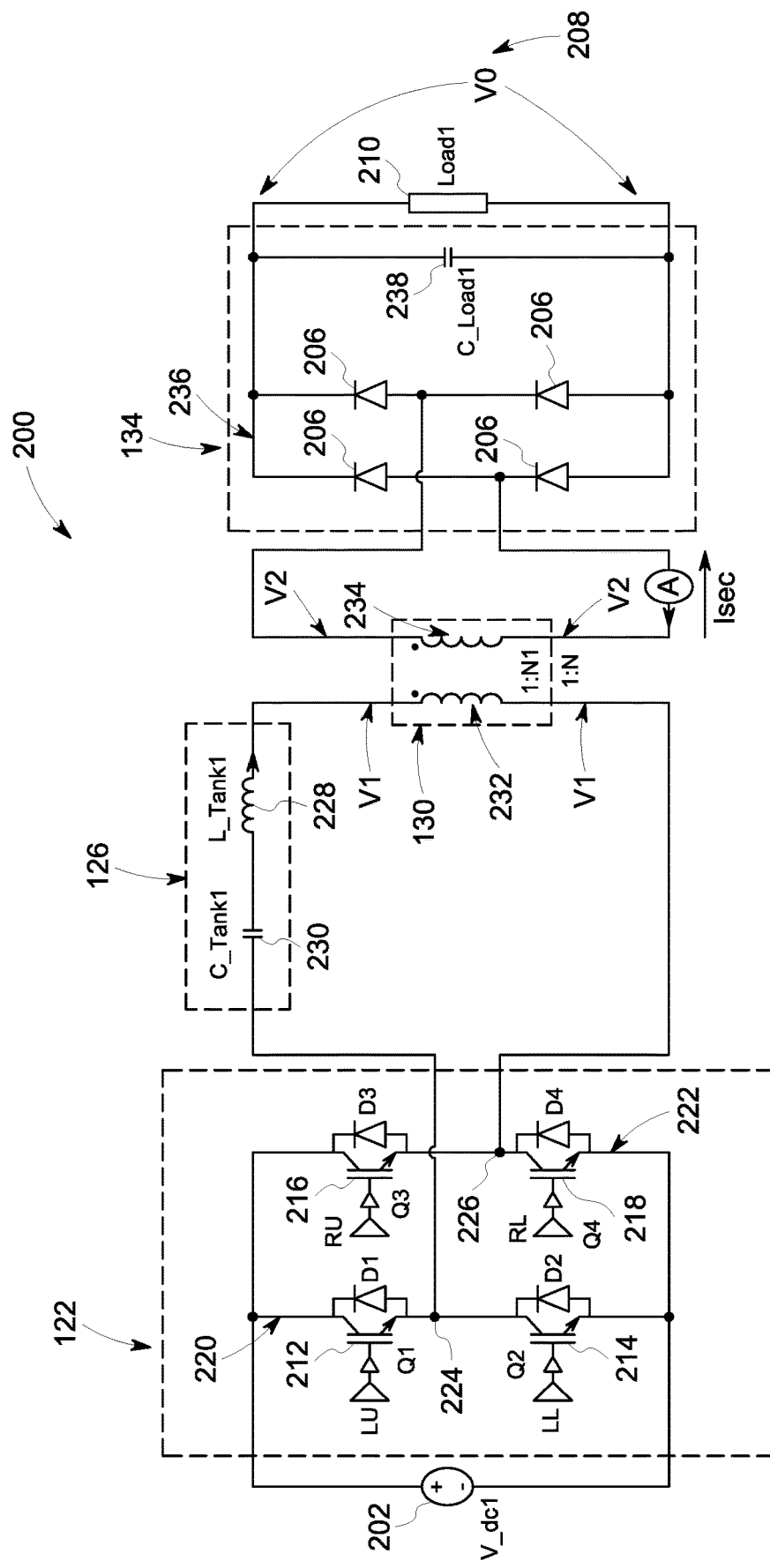
FIG. 3 is a schematic block diagram of a resonant power supply shown in FIG. 2 in accordance with an exemplary embodiment of the present disclosure.

FIG. 3 is a schematic block diagram of a resonant power converter 200 in accordance with an exemplary embodiment of the present disclosure. In general, similar to FIG. 2, the resonant power converter 200 includes the switching stage 122, resonant tank circuit 126, an isolation transformer 130, and the output stage 134. The switching stage 122 receives input DC voltage 202 and selectively supplies the DC voltage 202 to the resonant tank circuit 120 according to the control signals sent from the converter controller 118. The isolation transformer 130 serves to separate the resonant tank circuit 126 from the output stage 134. The isolation transformer 130 includes a primary winding 232 having a first AC voltage V1 and a secondary winding 234 having a second AC voltage V2. The turns ratio between primary winding and the secondary winding is 1/N i.e., V1/V2=1/N. The primary winding 232 is coupled to the resonant tank circuit 126, and the secondary winding 234 is coupled to the output stage 134. The output stage 134 outputs a regulated DC voltage 208 which is applied across a load 210. In one embodiment, the load 210 is the gradient amplifier 105 as shown in FIG. 1 or X-ray tube 112 as shown in FIG. 2.

In an embodiment, the switching stage 122 is arranged with a full-bridge configuration and includes four switching elements 212, 214, 216, 218 i.e., Q1, Q2, Q3 and Q4 respectively. The switching elements 212, 214, 216, 218 may be any suitable type of solid state switching devices, such as insulated gate bipolar transistors (IGBTs) and metal oxide semi-conductor field effect transistors (MOSFETs). Each of the switching elements 212, 214, 216, 218 includes an inbuilt diode (D1, D2, D3 and D4 respectively) connected in an anti-parallel configuration. The first switching element 212 and the second switching element 216 are coupled in series in a first converter leg 220 which may be referred to as a lag leg. The third switching element 216 and the fourth switching element 218 are coupled in series in a second converter leg 222 which may be referred to as a lead leg. As used herein, "lead" refers to the switching elements in the corresponding phase leg that initially change their switching state during a switching cycle, and "lag" refers to the switching elements in the corresponding leg that change their switching state with a phase delay with respect to the lead leg as determined by the control commands. In an embodiment, the two switching elements 212, 214 in the lag leg 220 are operated in a complementary manner, that is, when the first switching element 212 is gated on, the second switching element 214 is gated off. Similarly, the two switching elements 216, 218 in the lead leg 222 are also operated in a complementary manner. In other embodiments, the switching stage 122 may be implemented to have a half-bridge configuration and any other suitable topologies as is known in the art.

It should be noted that although the present control technique is explained with respect to the series resonant converter, the control technique is equally applicable to other resonant converters such as LLC resonant converter.

With continued reference to FIG. 3, in an implementation, the resonant tank circuit 126 is coupled between a first node 224 and a second node 226, where the first node 224 is a joint connection between the first switching element 212 and the second switching element 214, and the second node 226 is a joint connection between the third switching element 216 and the fourth switching element 218. The resonant tank circuit 126 includes a resonant inductor 228 and a resonant capacitor 230. The resonant inductor 228, the resonant capacitor 230 and the primary winding 232 of the isolation transformer 130 are in series connected between the first node 224 and the second node 226.

In an implementation, the output stage 134 includes a full-bridge rectifier 236 having a plurality of diodes 206 coupled to the secondary winding 234 of the isolation transformer 130. The full-bridge rectifier 236 is configured to rectify the voltage generated across the secondary winding 234 of the isolation transformer 130. The output stage 134 may further include an output capacitor 238 coupled in parallel with the full-bridge rectifier 236. The output capacitor 238 functions as a low pass filter for removing ripple signals in the DC voltage rectified by the full-bridge rectifier 236. Further, the controller 118 provides control signals LU, LL, RU and RL to control the switching elements 212, 214, 216 and 218 respectively as will be described in subsequent paragraphs.

Figure 4:
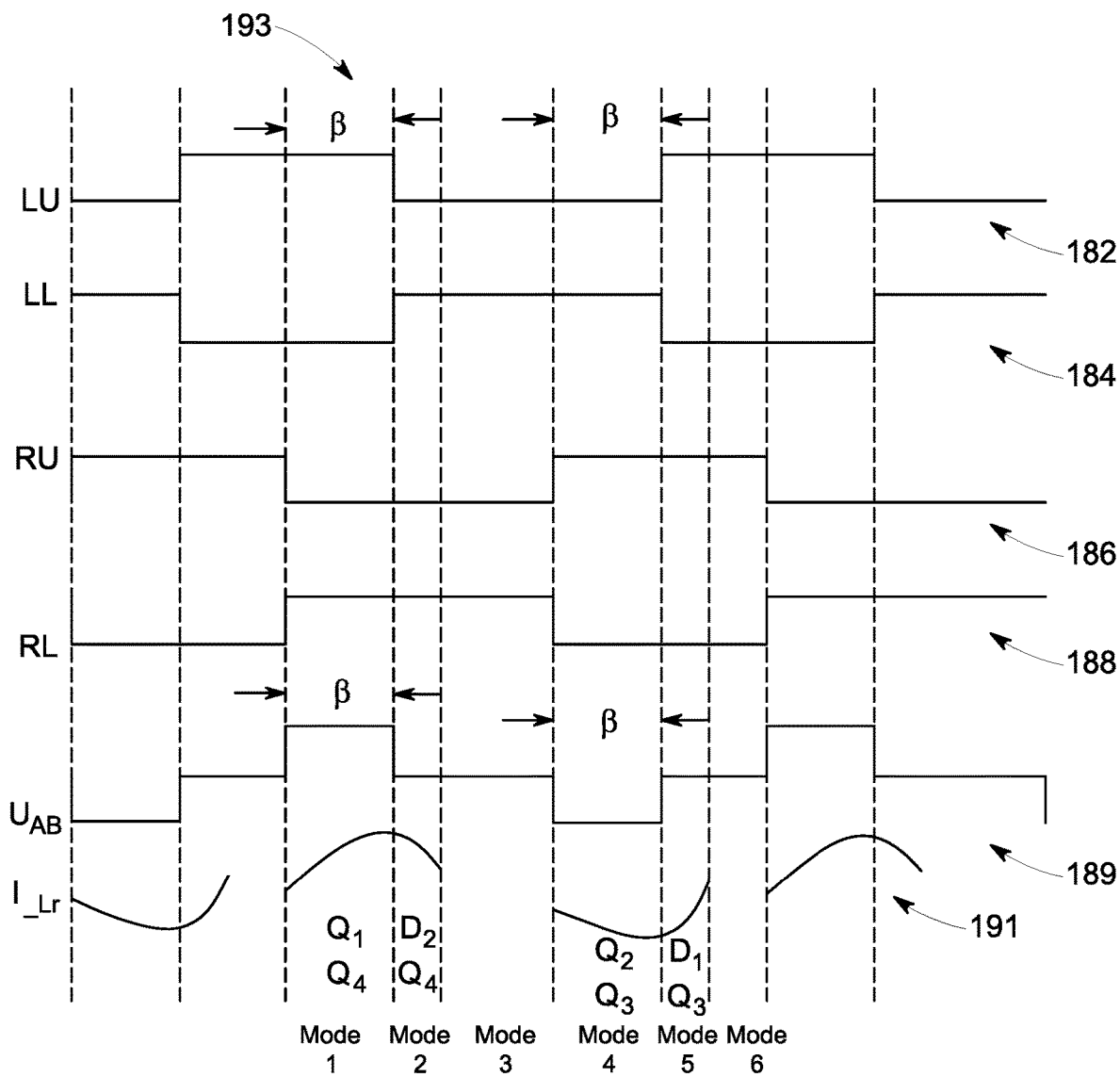
FIG. 4 is a timing diagram of various waveforms that are present in the resonant power supply shown in FIG. 2 and FIG. 3 in accordance with an exemplary embodiment of the present disclosure.

FIG. 4 is a timing diagram of various waveforms that are present in the resonant power converter 200 shown in FIG. 3 in accordance with an exemplary embodiment of the present disclosure. As shown in FIG. 4, a first waveform 182 and a second waveform 184 show the switching signals for driving the first switching device 212 and the second switching device 214 in the first converter leg 220 respectively. In an implementation, the first waveform 182 and the second waveform 184 are synchronized in a complementary manner, that is, when the first waveform 182 is on, the second waveform 184 is off and when the first waveform 182 is off, the second waveform 184 is on. Similarly, a third waveform 186 and a fourth waveform 188 show the switching signals for driving the third switching device 216 and fourth switching device 218 in the second converter leg 222 respectively. The third waveform 186 and the fourth waveform 188 β are phase shifted by the controller with respect to the first waveform 182 and the second waveform 184 by an angle (β) to increase power output in response to a control signal. Further, a voltage waveform 189 shows the voltage across the first node 224 and the second node 226, and a current waveform 191 shows the resonant current flowing through the resonant inductor 228 or the resonant tank circuit 126. In one implementation, as shown in FIG. 4, the voltage waveform 189 shows that the voltage between the first node 224 and the second node 226 has three values, positive input DC voltage 202, zero voltage, and negative input DC voltage 202. In one implementation, as shown in FIG. 4, the current waveform 191 indicates that the resonant current flowing through the resonant inductor 228 or the resonant tank circuit 126 changes in a nearly sinusoidal and discontinuous manner.

In an implementation, there are six modes of operation for the resonant power converter 200 using a phase shifted control. Further referring to FIG. 3 and, in the first mode, the first switching device 212 and the fourth switching device 218 are on, the voltage between the first node 224 and the second node 226 is equal to the positive input DC voltage 202, and the resonant current flowing through the resonant inductor 228 rises continuously in a nearly sinusoidal waveform. In the second mode, the first switching device 212 is turned off, the fourth switching device 218 is kept on, and the diode D2 is conducting for keeping the current flowing in a closed loop. During this period, the voltage between the first node 224 and the second node 226 is reduced to zero, and the current flowing through the resonant inductor 228 decreases gradually in a nearly sinusoidal waveform. After the resonant current reduces to zero, the states of four switching devices are kept unchanged to make the resonant current remain at zero for a certain time, which is the third mode. That is, the resonant power converter 200 is working in a current discontinuous mode. In the fourth mode, the second switching device 214 and the third switching device 216 are on, the voltage between the first node 224 and the second node 226 is equal to the negative input DC voltage 202, and the resonant current flows through the resonant inductor 228 in an opposite direction in a nearly sinusoidal waveform. In the fifth mode, the second switching device 214 is turned off, the third switching device 216 is kept on, and the diode D1 is conducting for keeping the current flowing in a closed loop. During this period, the voltage between the first node 224 and the second node 226 is reduced to zero, and the current also flows through the resonant inductor 227 in a nearly sinusoidal waveform. After the resonant current reaches zero, depending on meeting the minimum pulse width modulation (PWM) frequency limit, the states of four switching devices are kept unchanged to make the resonant current remain at zero for certain time which is the sixth mode.

Figure 5:
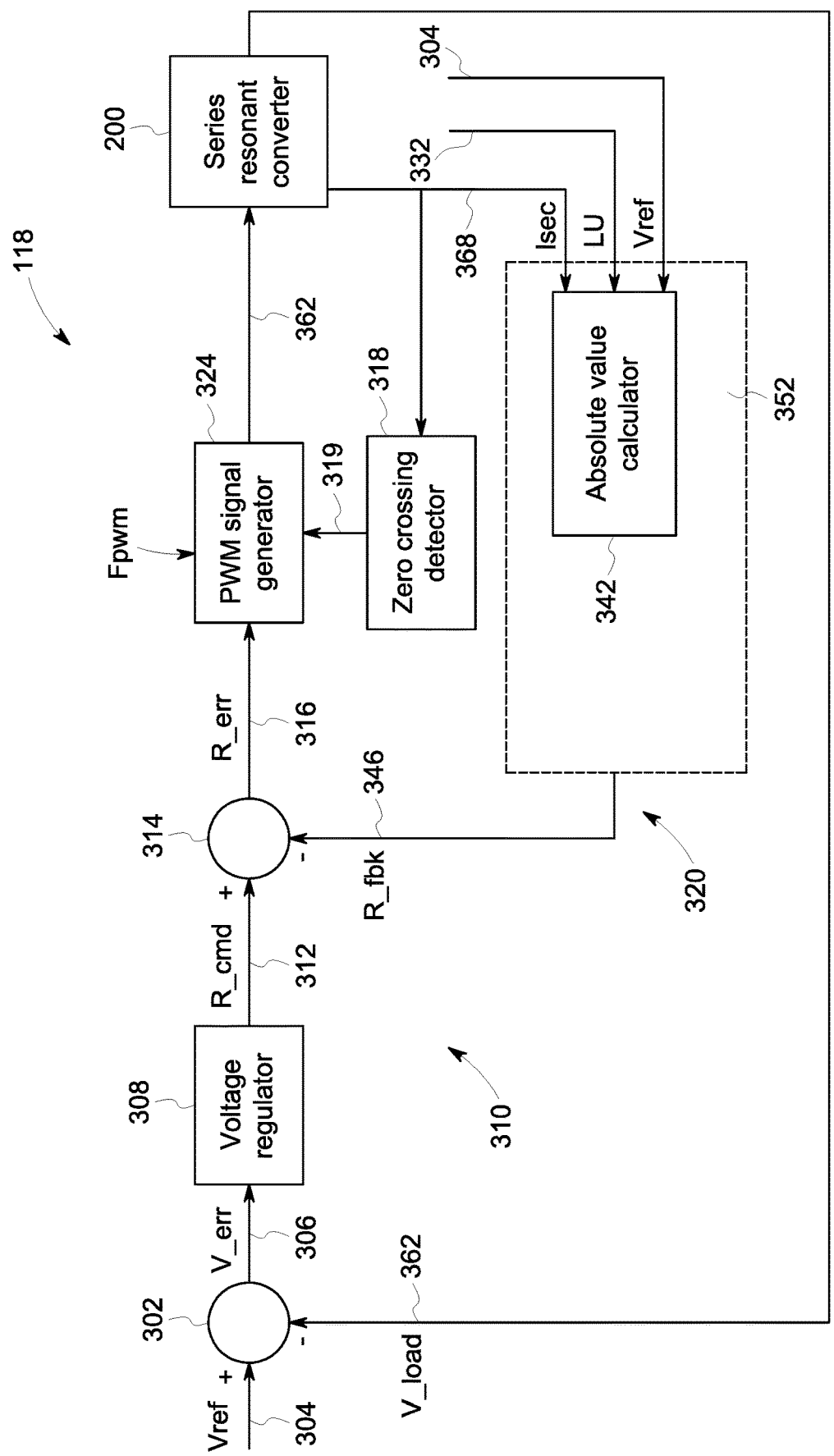
FIG. 5 is a detailed control diagram implemented in a converter controller shown in FIG. 3 in accordance with an exemplary embodiment of the present disclosure.

FIG. 5 is a control diagram implemented in a converter controller 118 shown in FIG. 2 in accordance with one exemplary embodiment of the present disclosure. In practical applications, the converter controller 118 may be implemented by a micro-controller or a digital signal processor (DSP) or a field-programmable gate array (FPGA), for example. In general, the control diagram shown in FIG. 5 includes two control loops, that is, an outer control loop or outer controller 310 and an inner control loop or inner controller 320. The outer control loop 310 is a voltage control loop which is designed to regulate the output voltage or load voltage according to commanded voltage signals. More specifically, the converter controller 118 includes a summation element 302 that is configured to receive an output voltage feedback signal 362 from the output stage 134 of the resonant power converter 200. The summation element 302 also receives a voltage command signal 304 (Vref) representative of the voltage to be achieved at the output of the output stage 134 of the resonant power converter 200. The summation element 302 subtracts the output voltage signal 362 (V_load) from the voltage command signal 304 and derives a voltage error signal 306. The derived voltage error signal 306 is supplied to a voltage regulator 308 for generating a tank command signal 312 (Rcmd) designed to drive the voltage error signal 306 to zero. The inner control loop 320 is a control loop that is designed to regulate an actual tank signal according to the tank command signal 312. It should be noted that the tank command signal 312 represents a signal that is a combination of absolute values of a current and a voltage in the tank circuit 126 that is desired. More specifically, the converter controller 118 includes a processing module 352 that is used to calculate an actual tank signal (i.e., actual signal that is a combination of absolute values of the current and the voltage in the tank circuit) according to a secondary winding current 368, a switching signal 332 (e.g., LU), and reference voltage signal 304 (i.e., Vref).

In an implementation, the processing module 352 includes an absolute value calculator 342. Absolute value calculator 342 calculates a first current signal $I_{Lr}$ which is representative of a current flowing through the resonant inductor 228. In general, the resonant inductor current is the same current that is flowing in the primary winding 232 (i.e., Ipri) of transformer 130 subtracted by the magnetizing current Imag of the transformer. The secondary winding current Isec is equal to the Ipri/N, where N is the transformer winding turns ratio. Thus, the first current signal $I_{Lr}$ or the primary winding current (Ipri) is (Isec*N) which is representative of a current flowing through the resonant inductor 228. It should be noted that the magnetizing current Imag can be neglected here because it is very small as compared to the overall current.

Absolute value calculator 342 further calculates a resonant capacitor voltage Vcr and a primary winding voltage Vpri. The resonant capacitor voltage Vcr is calculated by integrating the secondary winding current Isec and multiplying by a constant N/Cr, where Cr is the capacitance value of the resonant capacitor. Thus, the voltage Vcr across the resonant capacitor 230 may be calculated as: Vcr=(∫Isec*N)/Cr. In general, the resonant capacitor voltage Vcr can be expressed according to the following equation in time domain:

$$V_{cr}(t) = (V_{dc} - V_{pri})\left\{1 - \cos\left(\frac{t}{\sqrt{L_r C_r}}\right)\right\},\qquad \text{Eqn. 1}$$

where $V_{cr}(t)$ is the resonant capacitor voltage, $V_{dc}$ is the input DC voltage 202, $V_{pri}$ is the primary winding voltage Vpri, $L_r$ is the inductance of the resonant inductor 228, $c_r$ is the capacitance of the resonant capacitor 230. The resonant inductor current 368 $I_{Lr}(t)$ can be expressed according to the following equation:

$$I_{Lr}(t) = \frac{(V_{dc} - V_{pri})}{\sqrt{L_r C_r}} \sin\left(\frac{t}{\sqrt{L_r C_r}}\right),\qquad \text{Eqn. 2}$$

The solutions to the equations (1) and (2) are circles when drawn in a $V_{cr}$–$Z_0 I_{Lr}$ state plane, where $Z_0$ is the characteristic impedance of the resonant tank circuit 126 and can be expressed according to the following equation:

$$Z_0 = \sqrt{\frac{L_r}{C_r}}.$$

The absolute value calculator 342 is configured to calculate the actual tank signal 346 (Rfbk) according to the first current signal $I_{Lr}$, the resonant capacitor voltage Vcr, and the primary winding voltage Vpri. The primary winding voltage Vpri is calculated by the absolute value calculator 342 by flipping between the reference voltage Vref and −Vref based on the switching signal 332.

In an implementation, the actual tank signal 346 (Rfbk) is calculated by the absolute value calculator 342 according to the following equation:

$$Rfbk = |Z_0 * I_{Lr}| + |V_{Cr} + V_{pri}| \qquad \text{Eqn. 4}$$

where $Z_0$ is the characteristic impedance of the resonant inductor 228 and the resonant capacitor 230 as determined by equation 3, $I_{Lr}$ is the calculated resonant inductor current, $V_{Cr}$ is the calculated resonant capacitor voltage, and $V_{pri}$ is the calculated primary winding voltage (same as V1). It should be noted that $|Z_0 * I_{Lr}|$ represents absolute value of signal $Z_0 * I_{Lr}$ and $|V_{Cr} + V_{pri}|$ represents absolute value of signal $V_{Cr} + V_{pri}$.

It should be noted that in one embodiment, instead of the actual tank signal an actual radius signal which is a representative of actual tank circuit energy may be determined based on a square root calculation. For example, the actual radius signal Rd may be calculated as $$Rd = \sqrt{(Z_0 * I_{Lr})^2 + (V_{Cr} + V_{pri})^2} \qquad \text{Eqn. 5}$$

In another embodiment, a hybrid approach may be utilized which is a combination of the of the actual tank signal Rfbk of eq. 4 and actual radius signal Rd of eq. 5 In this embodiment, a hybrid tank signal Rfb is calculated based on following equation:

$$Rfb = [\alpha * |Z_0 * I_{Lr}|] + \sqrt{((1-\alpha) * Z_0 * I_{Lr})^2 + (V_{Cr} + V_{pri})^2} \qquad \text{Eqn. 6}$$

where α is a proportionate constant value which determines the percentage of the first current signal $I_{Lr}$ value determined based on absolute value calculation and the remaining percentage i.e., (1−α) is then used for determining the first current signal $I_{Lr}$ value based on square root calculation. The value of the proportionate constant α may be in the range from 0 to 1. In other words, in the hybrid approach, the hybrid tank signal Rfb includes 2 parts, one based on absolute value calculation Rfbk and another based on square root calculation Rd. If the proportionate constant α is 0 then equation 6 becomes same as equation 5, whereas if the proportionate constant α is 1 then equation 6 becomes same as equation 4.

The converter controller 118 further includes a second summation element 314 for receiving the tank command signal 312 as a positive input and the actual tank signal 346 as a negative input. The second summation element 314 subtracts the actual tank signal 346 from the tank command signal 312, and derives a tank error signal 316, which is supplied to a pulse width modulation (PWM) signal generator 324. The PWM signal generator 324 generator is used for generation of the switching signals that are used to drive the switching devices in the switching stage 122 shown in FIG. 3. In one embodiment, the PWM signal generator generates the switching signal based on a PWM state machine by utilizing the zero crossing detector signal 319 from a zero crossing detector 318, tank error signal 316 and the switching frequency value Fpwm. The zero crossing detector 318 receives the secondary winding current Isec as input and provides the zero crossing detector signal 319.

Figure 6:
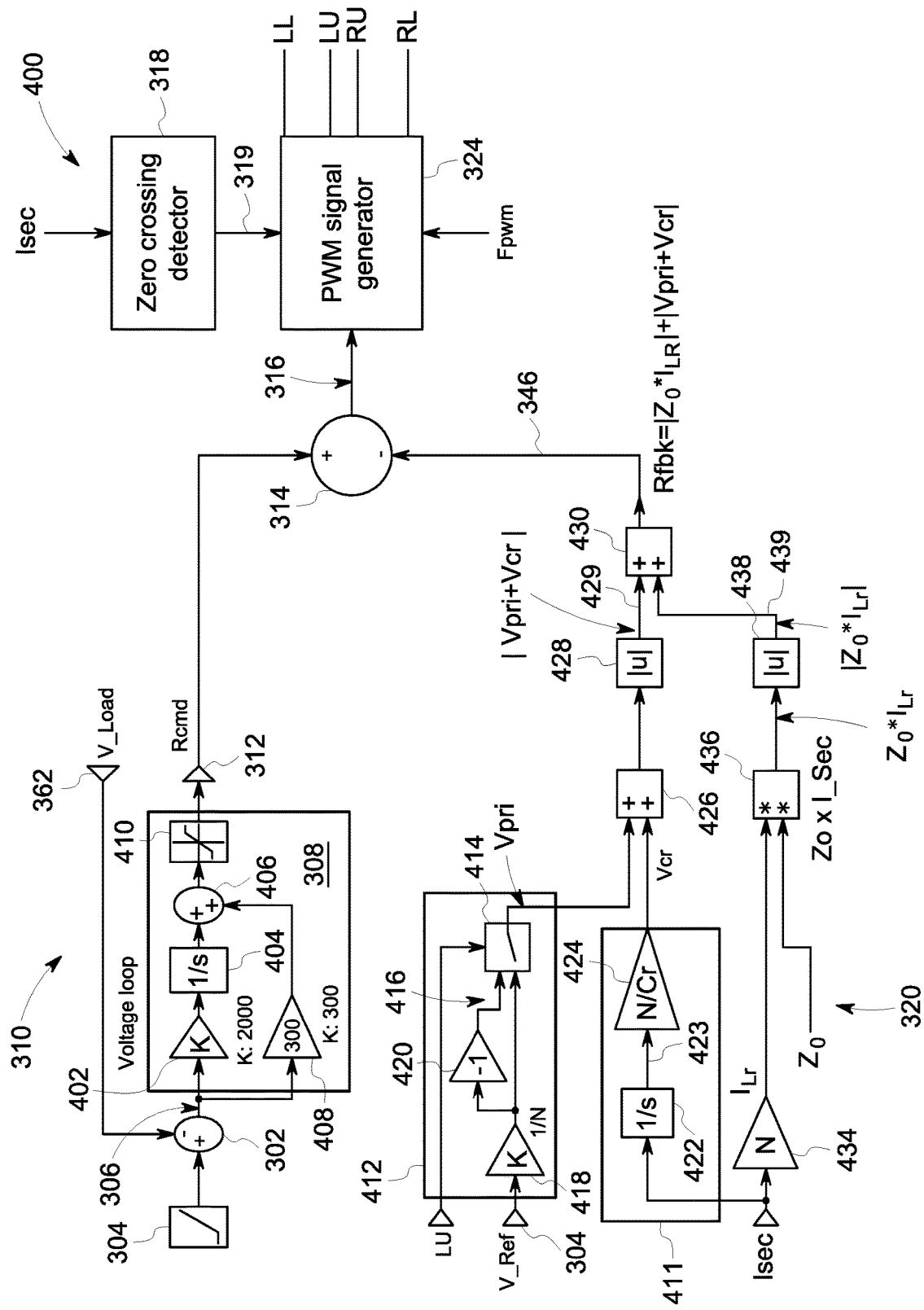
FIG. 6 is another detailed control diagram implemented in the converter controller shown in FIG. 2 in accordance with an exemplary embodiment of the present disclosure.

FIG. 6 is a detailed control diagram 400 showing details of absolute value calculator 342 of FIG. 5 based on equation 4 in accordance with another exemplary embodiment of the present disclosure. As with FIG. 5, the control diagram 400 includes an outer control loop 310 and an inner control loop 320. The outer control loop 310 is a voltage control loop which is designed to regulate the output voltage or load voltage according to commanded voltage signals. More specifically, the outer control loop includes a summation element 402 that is configured to receive an output voltage feedback signal 362 (V_load) and a voltage command signal 304 (Vref). The summation element 302 subtracts the output voltage signal 362 from the voltage command signal 304 and derives a voltage error signal 306 (Verr). The derived voltage error signal 306 is supplied to a voltage regulator 308 for generating the tank command signal 312 (Rcmd) designed to drive the voltage error signal 306 to zero. In one embodiment, the voltage regulator 308 includes a Proportional Integrator (PI) controller. For example, voltage regulator 308 includes an integrator gain block 402 which multiplies the voltage error signal 306 with a first gain. The output of the integrator gain block 402 is provided to an integrator block 404 which integrates the output signal of the integrator gain block 402. Further, the result of the integration by the integrator block 404 is provided to a summing block 406. The voltage regulator 308 further includes a proportional gain block 408 which multiplies the voltage error signal 306 with a second gain and then provides the resultant signal to the summing block 406. The summing block adds the two signals from integrator block 404 and second gain block 408 and provides a control signal to a limiter block 410. The limiter block 410 limits the control signal within a range and provides the tank command signal 312 (Rcmd) as the output.

Further, the inner control loop 320 implements equation 4 above to determine the actual tank signal Rfbk. Inner control loop 320 includes a primary winding voltage calculator 412 which determines the primary winding voltage Vpri based on reference voltage signal 304 Vref, transformer winding ratio N and a switching signal (e.g., LU) for one of the switching devices of switch array 122. For example, the primary voltage calculator 412 includes a switching module 414 which receives a control signal (e.g., switching signal LU), a primary proportionate reference voltage signal (Vref/N) and an inverted primary proportionate reference voltage signal 416 (−Vref/N). It should be noted that the reference voltage signal Vref is the desired load voltage and in steady state is equivalent to the load voltage. Thus, there is no need to actually measure the load voltage for determination of primary winding voltage instead the reference voltage signal Vref itself is sufficient. On the primary winding side, the reference voltage may be reflected as Vref/N. Thus, the reference voltage signal Vref is multiplied by a gain block 418 having a gain value of 1/N, wherein N is the transformer winding ratio. Based on the control signal LU, the switching module 414 flips between +Vref and −Vref (i.e., inverted Vref). The inverted Vref is provided by a gain block 420 which inverts the signal Vref by multiplying it with a constant value of −1.

Equation 4 further uses the resonant capacitor voltage Vcr which can be calculated by integrating the secondary winding current instead of actually measuring the resonant capacitor voltage. This eliminates the need of providing a voltage sensor across the resonant capacitor 230. Thus, in FIG. 6, a resonant capacitor voltage calculator 411 includes an integrator module 422 which receives the secondary current Isec as an input signal, integrates the signal Isec and provides an integral signal 423 which is the result of the integration to a gain block 424. The gain block 424 which multiplies the integral output by a constant value (N/Cr) to generate the resonant capacitor voltage signal Vcr as an output. The voltage signals Vcr and Vpri are provided as input signals to a summation block 426. The summation block 426 add the signals Vcr and Vpri and provides the summation to a first absolute value calculation block 428 to calculate a first absolute value signal 429 equal to |Vpri+Vcr|.

FIG. 6 further includes a resonant inductor current calculator 434 which is another gain block that multiplies secondary current Isec with a constant (N) and generates resonant inductor current $I_{Lr}$ as an output signal. The resonant inductor current $I_{Lr}$ is further multiplied by a constant $Z_0$ in a multiplication block 436. It should be noted that as explained in equation 3 above, $Z_0$ is equal to $$Z_0 = \sqrt{\frac{L_r}{C_r}}.$$

The output signal ($Z_0 * I_{Lr}$) of the multiplication block 436 is provided as an input to a second absolute value calculation block 438 which provides a second absolute value signal 439 equal to $|Z_0 * I_{Lr}|$. A summation block 430 adds the first absolute value signal 429 and the second absolute value signal 439 and provides actual tank signal 346 (Rfbk) as an output.

The second summation element 314 subtracts the actual tank signal 346 from the tank command signal 312, and derives the tank error signal 316, which is supplied to the PWM signal generator 324. In another embodiment, a comparator may be used instead of the second summation element, wherein the comparator determines whether actual tank signal 346 is greater than the tank command signal 312. The PWM signal generator 324 generates the switching signal based on a PWM state machine by utilizing the zero crossing detector signal 319 from a zero crossing detector 318, tank error signal 316 and the switching frequency value Fpwm. The zero crossing detector 318 receives the secondary winding current Isec as an input signal, detects zero crossing instant of the signal Isec and provides the zero crossing detector signal 319 as an output.

Figure 7:
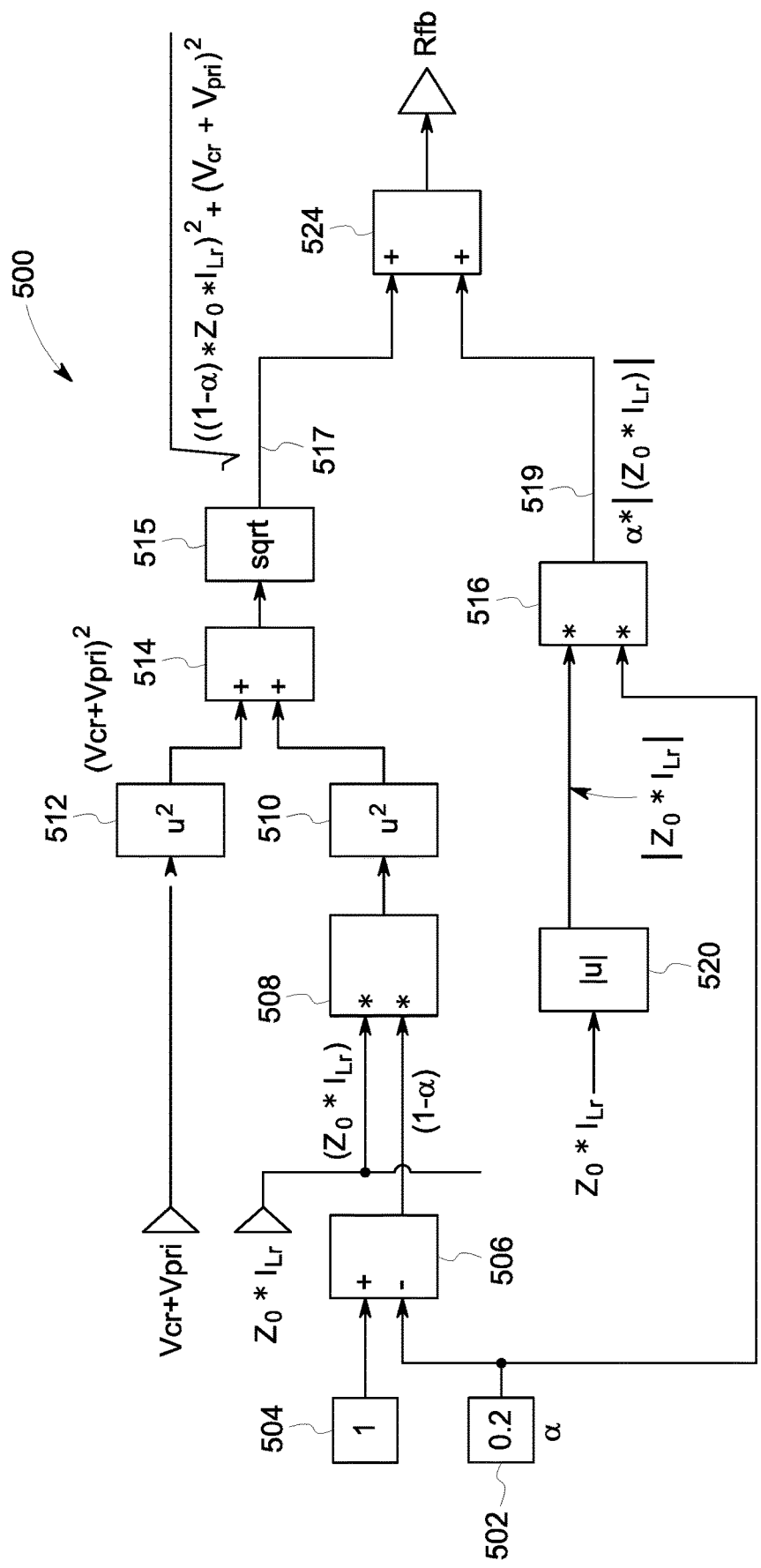
FIG. 7 is a detailed control diagram showing implementation of a hybrid control approach in accordance with an exemplary embodiment of the present disclosure.

FIG. 7 is another control diagram 500 showing details of a hybrid tank signal calculation based on the hybrid approach of equation 6 in accordance with another exemplary embodiment of the present disclosure. Specifically, in FIG. 7, the voltage signals Vcr and $Z_0 * I_{Lr}$ are determined exactly as shown in FIG. 6. However, instead of merely using absolute calculation blocks to determine actual tank signal 346 (Rfbk), control diagram 500 also utilizes a square and square root functions to determine the radius signal Rd. In general, hybrid tank signal Rfb includes a first fraction a (e.g., 0.2) of an absolute value control signal and a second fraction portion 1−α (e.g., 0.8) of a square root value control signal.

Control diagram 500 includes a constant block 502 which provides the predetermined first fraction value α and another constant value block 504 of value 1. A subtraction block 506 subtracts the first fraction a from the constant value 1 and provides, the second fraction value (1−α) as an output. The predetermined value of a may be in the range from 0 to 1. Further, control diagram 500 uses a first multiplication block 508 that multiplies the two signals, second fraction value (1−α) and the signal $Z_0 * I_{Lr}$ and provides the multiplication output (1−α)*$Z_0 * I_{Lr}$.

Control diagram 500 further uses square function blocks 510 and 512 to generate a square value of the signal Vcr+Vpri and the multiplication output signal (1−α)*$Z_0 * I_{Lr}$ respectively. A summation block 514 adds the output signals of square blocks 510 and 512 and provides the summation to a square root function block 515. The square root function block 515 generates the square root of output signal of the summation block 514 and provides a square root value control signal or a second portion 517 of the hybrid tank signal Rfb. The second portion 517 of hybrid tank signal is given as $\sqrt{((1-\alpha)*Z_0*I_{Lr})^2 + (V_{Cr}+V_{pri})^2}$.

An absolute value determination block 520 determines the absolute value $|Z_0 * I_{Lr}|$ which is provided to a multiplication block 516 that also receives the first fraction value 502 (*a*) as another input signal. The multiplication block 516 then multiplies the two input signals to provide the absolute value control signal 519 equal to $\alpha * |Z0 * I_{Lr}|$ which represents a first portion Rfb1 of the hybrid tank signal Rfb. A summation block 524 adds the first portion signal 519 and second portion signal 517 of the hybrid tank signal Rfb to provide the hybrid tank signal Rfb. In one embodiment, where the hybrid control approach is used, the hybrid tank signal Rfb is used instead of tank signal Rfbk in the controller 400 to generate the switching signals for the switching devices.

Figure 8:
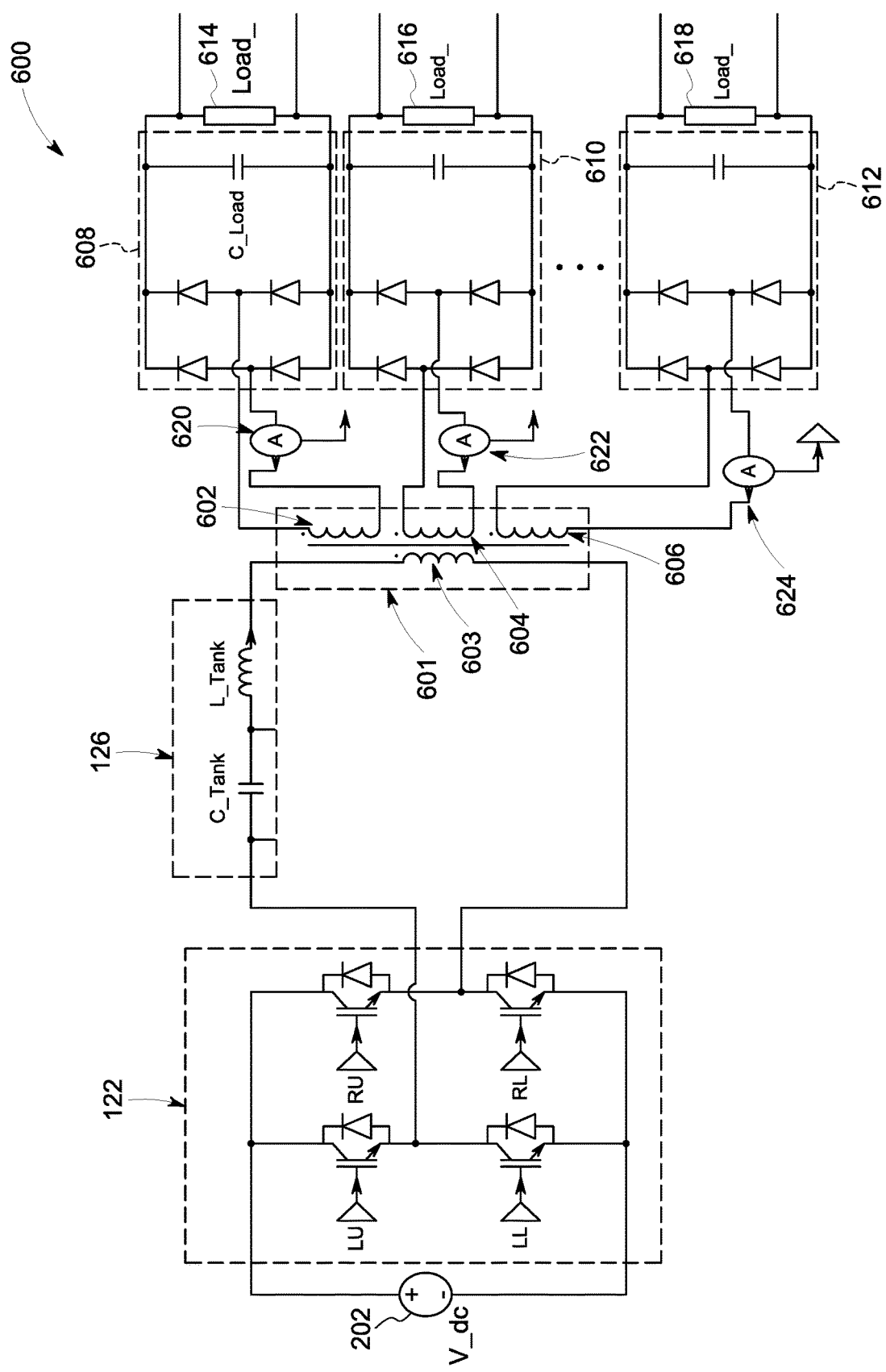
FIG. 8 is another schematic block diagram of the resonant power supply in accordance with an exemplary embodiment of the present disclosure.

FIG. 8 is a schematic block diagram of another resonant power converter 600 in accordance with an exemplary embodiment of the present disclosure. Similar to resonant power converter 200 of FIG. 3, resonant converter 600 includes switching stage 122, resonant tank circuit 126, an isolation transformer 601 with a primary winding 603. However, the resonant power converter 600 provides power to a plurality of loads 614, 616 and 618 instead of just a single load as in resonant power converter 200. The isolation transformer 601 includes a primary winding 603 coupled to the resonant tank circuit 126 and a plurality of secondary windings 602, 604, 606, each of which is coupled with a respective output stage 608, 610 or 612. The switching stage 122 receives input DC voltage 202 and selectively supplies the DC voltage 202 to the resonant tank circuit 120 according to the control signals sent from the converter controller 118.

It should be noted that in resonant power converter 200 of FIG. 4, to determine the resonant inductor current, the secondary winding current Isec was divided by a transformer winding ratio N. However, in the embodiment of FIG. 8, given there is a plurality of secondary windings, a plurality of current sensors 620, 622 and 624 is used to measure secondary winding currents. The corresponding turns ratios are then utilized to calculate the equivalent resonant inductor current for each current signal measured from the plurality of current sensors. Finally, the equivalent resonant inductor currents corresponding to all the current sensors 620, 622 and 624 are added together to calculate the actual resonant inductor current $I_{Lr}$.

If the ratio of primary winding turns to each of the secondary windings is same, then the plurality of current sensors may not be needed. In such a case, only one current sensor in which all the secondary windings are routed through a current transformer is used to measure the secondary winding current in all windings. The turns ratio is then utilized to calculate the resonant inductor current from the total secondary winding current.

Figure 9:
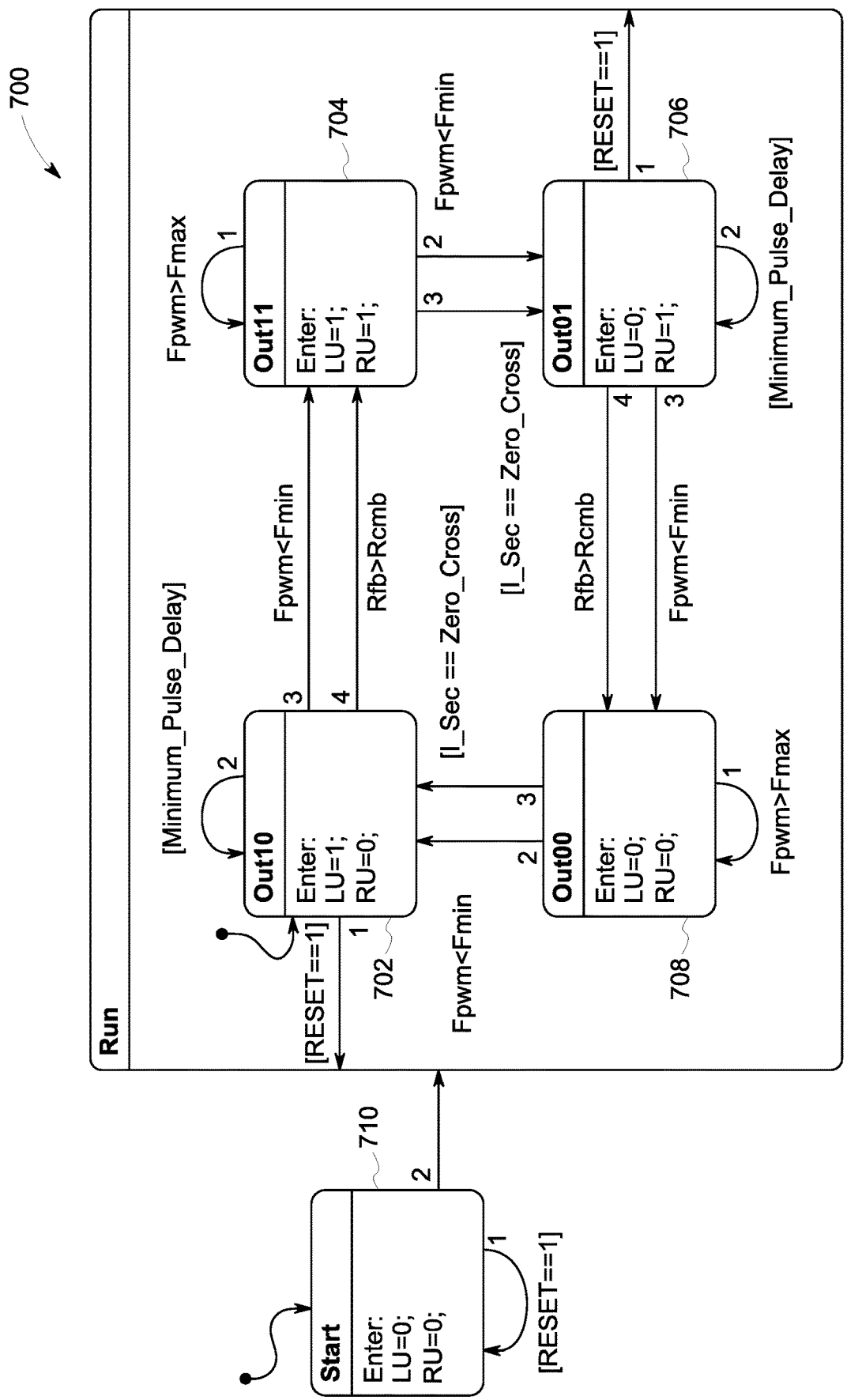
FIG. 9 is a state diagram showing operation of the resonant power supply in accordance with an exemplary embodiment of the present disclosure.

FIG. 9 is a state diagram 700 which may be implemented in PWM signal generator regulator 324 of FIG. 6, in accordance with another exemplary embodiment of the present disclosure. Specifically, state diagram 700 shows four switching states 702, 704, 706 and 708 corresponding to various values of switching signals LU, LL, RU and RL. Switching signals LU, LL, RU and RL are used to control the switching elements 212, 214, 216 and 218 respectively. It should be noted that signals LU and LL are complementary of each other i.e., when LU is equal to 1 then LL is equal to 0 and when LU is equal to 0 then LL is equal to 1. Similarly, signals RU and RL are complementary of each other i.e., when RU is equal to 1 then RL is equal to 0 and when RU is equal to 0 then RL is equal to 1. Further, when any of the signals LU, LL, RU or RL are equal to 1 then the corresponding switching element 212, 214, 216 or 218 is turned on, whereas when any of the signals LU, LL, RU or RL are equal to 0 then the corresponding switching element 212, 214, 216 or 218 is turned off. The switching state 702 corresponds to signals LU=1 and RU=0 and the switching state 704 corresponds to signals LU=1 and RU=1. Further, the switching state 706 corresponds to signals LU=0 and RU=1 and the switching state 708 corresponds to signals LU=0 and RU=0.

During the starting state 710 of the operation, signal LU=0 and RU=0 and then the operation moves to the state 702. From state 702 the converter 200 will move back to the starting state 710 whenever a reset signal is received. In other words, when reset signal RESET is equal to 1, the converter 200 always moves to start state 710. The movement between switching states 702, 704, 706 or 708 depends on minimum switching frequency Fmin, switching frequency Fpwm, actual tank signal Rfbk, reference tank command signal Rcmd and zero crossing of secondary winding current Isec. For example, if switching frequency Fpwm is lower than minimum switching frequency Fmin i.e., Fpwm<Fmin OR the actual tank signal Rfbk is greater than tank command signal Rcmd i.e., Rfbk>Rcmd then the converter moves from switching state 702 to switching state 704. However, it should be noted that the converter remains in switching state 702 if a minimum pulse delay has not occurred yet. The minimum pulse delay refers to a time delay kept between two switching signals of the same leg of the converter. This time delay ensures that two switches in the one leg of the converter do not turn on simultaneously causing a short circuit. Further, when switching frequency Fpwm is lower than minimum switching frequency Fmin i.e., Fpwm<Fmin or the zero crossing of secondary winding current Isec is occurring i.e., (Isec==zero cross) then the converter moves from switching state 704 to switching state 706. However, if the switching frequency Fpwm is greater than maximum switching frequency Fmax i.e., Fpwm>Fmax then the converter stays in switching state 704.

Moreover, when switching frequency Fpwm is lower than minimum switching frequency Fmin i.e., Fpwm<Fmin or the actual tank signal Rfbk is greater than tank command signal Rcmd i.e., Rfbk>Rcmd then the converter moves from switching state 706 to switching state 708. However, it should be noted that the converter remains in switching state 706 if the minimum pulse delay has not occurred yet. When switching frequency Fpwm is lower than minimum switching frequency Fmin i.e., Fpwm<Fmin or the zero crossing of secondary winding current Isec is occurring i.e., (Isec==zero cross) then the converter moves from switching state 708 back to switching state 702. However, if the switching frequency Fpwm is greater than maximum switching frequency Fmax i.e., Fpwm>Fmax then the converter stays in switching state 708. Thus, according to this state diagram, the switching devices 212, 214, 216 and 218 of switching stage 122 are operated in order to regulate the output voltage of the converter 200.

The advantages of the present technique include fast response to wide dynamic range of pulse loads, elimination of capacitor voltage measurement sensor, and stable control of the resonant power converter output voltage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A resonant power supply, comprising:
a resonant power converter configured to convert an input direct current (DC) voltage to an output DC voltage, wherein the resonant power converter comprises:
  a full bridge configuration of switching devices for converting the input DC voltage to a first alternating current (AC) voltage;
  a resonant tank circuit having a resonant inductor and a resonant capacitor coupled between the full bridge configuration of switching devices and an isolation transformer having a primary winding and a secondary winding, wherein the isolation transformer converts the first AC voltage to a second AC voltage;
  a full bridge rectifier for converting the second AC voltage to the output DC voltage;
a converter controller coupled to the resonant power converter for generating switching signals for the switching devices, the converter controller comprising:
  an outer controller to generate a tank command signal based on a voltage error signal between an output voltage command signal and an actual output voltage signal;
  an inner controller to generate an actual tank signal based on a secondary winding current and the output voltage command signal; and
  a signal generator for generating the switching signals for the switching devices based on a tank error signal between the tank command signal and the actual tank signal.

2. The resonant power supply of claim 1, wherein the outer controller comprises a proportional-integrator (PI) controller to receive the voltage error signal and a signal limiter which limits an output signal of the PI controller and generates the tank command signal.

3. The resonant power supply of claim 1, wherein the inner controller comprises a primary voltage calculator, a resonant capacitor voltage calculator and a resonant inductor current calculator.

4. The resonant power supply of claim 3, wherein the primary voltage calculator includes a switching module that determines a primary winding voltage by switching between the output voltage command signal and an inverted output voltage command signal based on one of the switching signals.

5. The resonant power supply of claim 4, wherein the resonant capacitor voltage calculator includes an integrator module for determining a resonant capacitor voltage by integrating the secondary winding current signal and multiplying an integral signal of the integrator with a first constant equal to N/Cr, where Cr is a capacitance value of the resonant capacitor and N is a transformer winding turns ratio.

6. The resonant power supply of claim 5, wherein the resonant inductor current calculator determines the resonant inductor current by multiplying the secondary winding current with a second constant equal to N.

7. The resonant power supply of claim 6, wherein the inner controller comprises a second absolute value calculation block for determining a second absolute value of a signal $Z_0 * I_{Lr}$, wherein $Z_0$ is a characteristic impedance of the resonant inductor and $I_{Lr}$ is the resonant inductor current.

8. The resonant power supply of claim 7, wherein the inner controller further comprises a first absolute value calculation block for determining a first absolute value of a signal Vpri+Vcr, wherein Vpri is the primary winding voltage and Vcr is the resonant capacitor voltage.

9. The resonant power supply of claim 8, wherein the inner controller includes a first summation block for adding the first absolute value and the second absolute value to provide the actual tank signal.

10. The resonant power supply of claim 7, wherein the second absolute value signal is multiplied by a first fraction value to determine an absolute value control signal.

11. The resonant power supply of claim 10, wherein the inner controller includes a first square function block and a second square function block to determine square values of signals Vpri+Vcr and $Z_0 * I_{Lr}$ respectively.

12. The resonant power supply of claim 11, wherein the inner controller includes a multiplier to multiply the square value of signal $Z_0 * I_{Lr}$ with a second fraction value.

13. The resonant power supply of claim 12, wherein the inner controller includes a square root function block to determine a square root value of a summation of output signals of the first square function block and the multiplier to provide a square root value control signal.

14. The resonant power supply of claim 13, wherein the inner controller determines the actual tank signal based on summation of the absolute value control signal and the square root value control signal.

15. The resonant power supply of claim 14, wherein the first fraction is $\alpha$ and the second fraction is $(1-\alpha)$ and wherein $\alpha$ is a predetermined value in the range from 0 to 1.

16. A method for controlling a resonant power supply, the resonant power supply comprising a full-bridge configuration of switching devices, a resonant tank circuit having a resonant inductor and a resonant capacitor and an isolation transformer having a primary winding and a secondary winding, the resonant tank circuit coupled between the full-bridge configuration and the isolation transformer, the method comprising:
  generating a tank command signal based on a voltage error signal between an output voltage command signal and an actual output voltage signal of the resonant power supply;
  generating an actual tank signal based on a secondary winding current and the output voltage command signal; and
  generating switching signals for the switching devices based on a tank error signal between the tank command signal and the actual tank signal.

17. The method of claim 16, wherein generating the tank command signal comprises utilizing a proportional integral (PI) controller for the voltage error signal.

18. The method of claim 17, wherein the actual tank signal is determined based on a summation of a first absolute value of a signal Vpri+Vcr and a second absolute value of a signal $Z_0 * I_{Lr}$, wherein $Z_0$ is a characteristic impedance of the resonant inductor, $I_{Lr}$ is a resonant inductor current, Vpri is a primary winding voltage and Vcr is a resonant capacitor voltage.

19. The method of claim 18, wherein the resonant capacitor voltage is determined by integrating a secondary winding current signal by an integrator and multiplying an integral signal of the integrator with a first constant equal to N/Cr, where Cr is a capacitance value of the resonant capacitor and N is a transformer winding turns ratio.

20. The method of claim 19, wherein the primary winding voltage is determined by switching between the output voltage command signal and an inverted output voltage command signal based on one of the switching signals.

21. The method of claim 20, wherein the resonant inductor current is determined by multiplying the secondary winding current with a second constant equal to N.

* * * * *